United States Patent
Chou et al.

(10) Patent No.: US 7,990,595 B1
(45) Date of Patent: Aug. 2, 2011

(54) OPTICAL MULTI-RING SCANNER

(75) Inventors: Ming-Chieh Chou, Tainan (TW); Pin Chang, Hsinchu (TW); Hung-Chung Li, Hualien County (TW); Chung-De Chen, Miaoli County (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 12/827,039

(22) Filed: Jun. 30, 2010

(30) Foreign Application Priority Data

Feb. 5, 2010 (TW) .............................. 99103473 A

(51) Int. Cl.
*G02B 26/08* (2006.01)
(52) U.S. Cl. ............... 359/198.1; 359/199.1; 359/199.2; 359/199.3; 359/199.4; 359/200.6; 359/200.7; 359/200.8; 359/224.1
(58) Field of Classification Search .... 359/198.1–200.8, 359/224.1–224.2; 310/209, 211, 36, 40 MM
See application file for complete search history.

(56) References Cited

U.S. PATENT DOCUMENTS

| | | | |
|---|---|---|---|
| 6,965,177 B2 | 11/2005 | Turner et al. | |
| 2005/0253055 A1 | 11/2005 | Sprague et al. | |
| 2007/0047046 A1 | 3/2007 | Ji | |
| 2007/0047646 A1 | 3/2007 | Koh et al. | |
| 2008/0238592 A1* | 10/2008 | Ko et al. | 335/222 |
| 2009/0284816 A1 | 11/2009 | Davis et al. | |

* cited by examiner

*Primary Examiner* — James Phan
(74) *Attorney, Agent, or Firm* — WPAT, PC; Justin King

(57) ABSTRACT

An optical multi-ring scanner is disclosed, which comprises: a substrate; an outer ring driving element, disposed inside the substrate and configured symmetrically at two sides thereof with a pair of first arms that are connected respectively to the substrate; at least one inner ring driving element, each configured with a first inner ring driver in a manner that the first inner ring driver has a pair of second arms symmetrically disposed at a top side and a bottom side thereof while being connected to the outer ring driving element; and a mirror element, disposed inside the first inner ring driver and having a pair of third arms symmetrically disposed at a top side of a bottom side thereof; wherein, the third arm is disposed coaxial with the second arm while enabling the first arm to be disposed perpendicular to the second arm and the third arm.

27 Claims, 10 Drawing Sheets

OPTICAL MULTI-RING SCANNER

TECHNICAL FIELD

The present disclosure relates to an optical multi-ring scanner, and more particularly, to an optical multi-ring scanner having an additional ring-like structure sandwiched between its mirror element and outer ring while enabling the ring-like structure to be configured coaxial with the mirror element, in addition to that the optical multi-ring scanner with the additional ring-like structure adopts a modularization design and is designed to be driven by electromagnetic forces for enabling the same to perform a simultaneous two-dimensional scanning operation in both the vertical and horizontal directions while operating with comparatively larger scan angle and lower mirror temperature.

TECHNICAL BACKGROUND

Nowadays, mobile electronic devices, such as cellular phones, are quickly becoming something essential for our lives. It is estimated that the demand of cellular phone will exceed 1.2 billion at 2010, and it will increase to about 1.5 billion after 2012. By that time, there will be more than 5% of the cellular phone sold at 2012 that are configured with miniaturized projection modules, i.e. there will be about 75 million cellular phones that have miniaturized projection modules built therein. Nevertheless, it is noted that the key element for any miniaturized projection modules is the micro scanning mirror, as it can be the key component determining how a miniaturized projection module can be embedded inside a portable electronic device, such as a cellular phone a digital camera a notebook computer a person digital assistant (PDA), or a portable game console, and so on. In addition, the miniaturized projection module itself is the key component for electronic industry for developing products such as laser projectors, laser TVs, head-mount display modules, barcode readers, optical communication switches, and head-up displays, etc.

Depending on the type of light source used, the miniaturized projection modules can be divided into two categories, which are laser-based projection modules and LED-based projection modules. Nevertheless, there are significant differences between this two types of projection modules, which are described as following:
(1) By the use of laser light source of comparatively wider color gamut, the laser-based projection modules are enabled to produce images with better color saturation and higher resolution.
(2) Being the core structure of the laser-based projection modules, the MEMS double-axis reflection mirror are structured simply as a unique single mirror; and comparatively, since the LED-based projection modules adopt DLP technology, there are more than millions of micromirrors to be integrated into one single component. In addition, as the double-axis reflection mirror can be produced in a batch process manner by the use of a MEMS semiconductor process, the production of the laser-based projection modules are featured by its high production yield and low manufacturing cost.
(3) The laser-based projection modules are capable of producing high brightness, high directional projection upon any surface, no matter it is flat or curved, and without the use of any complex optical lens modules for focusing, by that the laser-based projection modules can be miniaturized so as to be embedded in electronic devices that are becoming thinner, smaller and lighter. Therefore, the laser-based projection modules are commercially advantageous over the LED-based projection modules in every aspect including size, cost and performance.

Based upon the actuation principle, the MEMS scanning mirrors, being the key component of the laser miniaturized projection module, can be divided into the following types: the electromagnetic type, the electrostatic type, the piezoelectric type, and the thermoelectric type, etc. Nevertheless, each of those different types of MEMS scanning mirrors has its shortcomings that required to be overcome. For the electrostatic MEMS scanning mirrors, the micromirrors actuated by electrostatic forces may cause a problem of insufficient scanning angle when they are operating in an off-resonance state, and are usually required to be applied by a voltage higher than 80V for driving the same, not to mention that not only the components used in electrostatic MEMS scanning mirrors are prone be damaged by absorption effect, but also the manufacturing yield of the electrostatic MEMS scanning mirrors can be unsatisfactory since the structure of the electrostatic MEMS scanning mirrors may be very complicated. For the electromagnetic MEMS scanning mirrors, as there are usually coils formed on the micromirrors by electroplating, the micromirrors can be deformed by the heat accumulation resulting from the coils. For the thermoelectric MEMS scanning mirror, it is impractical by its low scanning frequency that is resulted from the problem of thermal effect. For the piezoelectric MEMS scanning mirrors, not to mention that it can be very large in size, the comparatively low displacement resulting from the piezoelectric actuation may cause a problem of insufficient scanning angle. Thus, for designing a good portable laser miniaturized projection module, it is importance to feature out an optimal way for actuating the MEMS scanning mirrors.

Currently, the most popular and successful design used in the miniaturized projection module for driving the scanning components is the electromagnetic actuation design, in which there are coils formed on the micromirrors by electroplating so as to be used for generating Lorentz forces that are used as the driving force for driving the micromirrors to move. Nevertheless, although the electromagnetic miniaturized projection module has advantages including large scanning angle, low working voltage, linear stepping angle effect, and high resolution, etc., it is disadvantageous in that: manufacturing yield of the electrostatic MEMS scanning mirrors can be unsatisfactory since the structure of the coils formed on the micromirrors may be very complicated that can only be achieved after tens of photo mask processes; and also, the micromirrors can be deformed by the heat accumulation resulting from the charged coils. Thus, the manufacturers of miniaturized projection module are now focusing their researches for resolving the aforesaid problems.

It is noted that the Lorentz forces used for driving the electromagnetic scanning components are generated by the interactions between currents charging in the coils that are formed on the scanning components and magnetic fields resulting from the permanent magnets that are disposed at two opposite sides of the scanning components. One such electromagnetic scanning component is exemplified in U.S. Pat. Pub. No. 20050253055, entitled "MEMS device having simplified driver", in which both the fast scan axis and the slow scan axis of any silicon-based mirror are electroplated with metal coils for enabling the two axes to be driven by Lorentz forces. However, although by the means disclosed in the aforesaid U.S. patent application the scanning angle is increased, the mirror deformation caused by the heat accumulation from the charged coils is still unresolved.

One example relating to the use of magnetostatic forces for driving micromirrors is disclosed in U.S. Pat. No. 6,965,177, entitled "Pulse drive of resonant MEMS drivers", in which a mirror component are configured with permanent magnets attached respectively to the edges of its two axes while there are several electromagnetic coils being disposed underneath the same that are connected to an AC power source and thus are capable of generating a magnetic field varying with the AC frequency of the AC power source, so that by the interaction between the magnetic field and the permanent magnet, the mirror component are enabled to perform resonant oscillations according to the AC frequency. However, the aforesaid means is disadvantageous in that: since it is difficult to attach magnets on the mirror component and consequently the assemble cost is increased, mass production is infeasible, not to mention that the attaching of the magnets on the micromirrors that can be very fragile is going to have adverse effect upon the resonant frequency of the micromirrors and the durability of the same as well.

In addition, another example of a conventional electromagnetic driving device that is driven by Lorentz forces caused by charged coils is disclosed in U.S. Pat. Pub. No. 20070047046, entitled "Micro-mirror device and array thereof", in which a micro mirror device is structured as a dual-ring structure having a mirror plate sandwiched between an inner ring and an outer ring while enabling the mirror plate to be coupled to the inner ring and the outer ring by interconnecting reinforcement rims. the disposing of the inner ring is simply for stabilizing the mirror plate, preventing the mirror plate to move relative to the inner ring, and thereby, enabling the mirror plate to vibrate in synchronization with the inner ring without causing any unwanted angle amplification effect. However, it is noted that the additional inner ring not only will cost the size of the mirror device to increase, but also it has very little effect for stabilizing the mirror plate.

Accordingly, the conventional optical scanning device, no matter it is used for optical detection or laser projection is primarily composed of: a scanning mirror located at the center thereof; a single-ring structure arranged surrounding the scanning mirror; and a frame. Moreover, as the aforesaid three components are usually coupled to each other by two sets of torsion beams that are arranged orthogonal to each other, not only the scanning angle can not be enlarged effectively, but also the projection images can be distorted since the scanning mirror might be deformed by the high temperature of the coils. Moreover, as in most electromagnetic driving devices the coils that are formed by electroplating are formed as a double-layered structure, manufacturing yield can be unsatisfactory and the manufacturing cost may be high also since the structure of the double-layered coils may be very complicated that can only be achieved after tens of photo mask processes.

TECHNICAL SUMMARY

The object of the present disclosure provides an optical multi-ring scanner having an additional ring-like structure sandwiched between its mirror element and outer ring while enabling the ring-like structure to be configured coaxial with the mirror element, in addition to that the optical multi-ring scanner with the additional ring-like structure adopts a modularization design and is designed to be driven by electromagnetic forces for enabling the same to perform a simultaneous two-dimensional scanning operation in both the vertical and horizontal directions while operating with comparatively larger scan angle and lower mirror temperature.

To achieve the above object, the present disclosure provides an optical multi-ring scanner, comprising:
  a substrate, formed with a first hollow section while being configured with a first axial direction and a second axial direction that are perpendicular to each other;
  an outer ring driving element, formed with a second hollow section while being receiving inside the hollow section, the outer ring driving element further having two first torsion arms being respectively and symmetrically arranged at the two opposite sides of the outer ring driving element while both being connected to the substrate in a manner that each first torsion arm is arranged extending in a first extending direction as the first extending direction is parallel to the first axial direction;
  at least one inner ring driving element, each configured with a first inner ring driver in a manner that each first inner ring driver is formed with a third hollow section while being received inside the second hollow section, each first inner ring driver further having a pair of second torsion arms symmetrically disposed at the two opposite sides thereof while being connected to the outer ring driving element in a manner that each second torsion arm is arranged extending in a second extending direction as the second extending direction is parallel to the second axial direction; and
  a mirror element, disposed inside the third hollow section while having a pair of third torsion arms symmetrically disposed at two opposite sides of the mirror element in a manner that the pair of the third torsion arms are disposed coaxial with the pair of the second torsion arms while enabling each third torsion arm to be connected to the inner ring driving element.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DESCRIPTION OF THE EXEMPLARY EMBODIMENTS

For your esteemed members of reviewing committee to further understand and recognize the fulfilled functions and structural characteristics of the disclosure, several exemplary embodiments cooperating with detailed description are presented as the follows.

Figure 1:
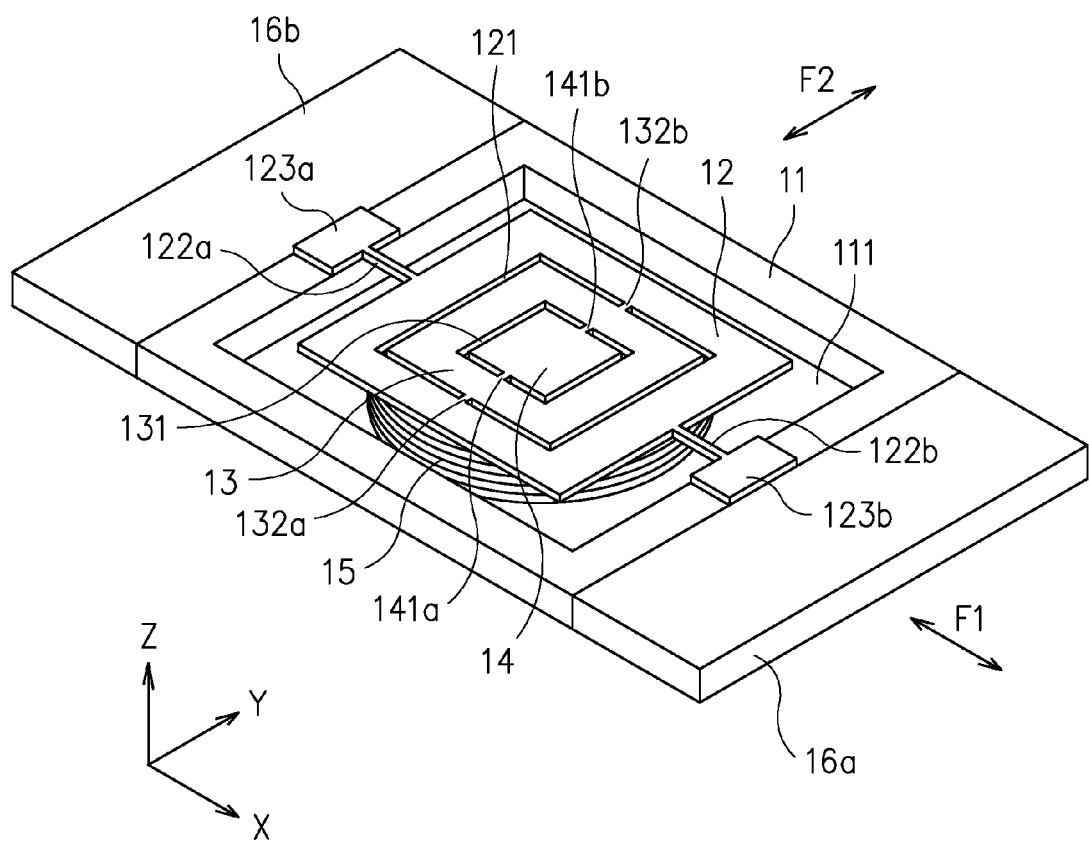
FIG. 1 is a three dimensional view of an optical multi-ring scanner according to a first embodiment of the present disclosure.
Figure 2:
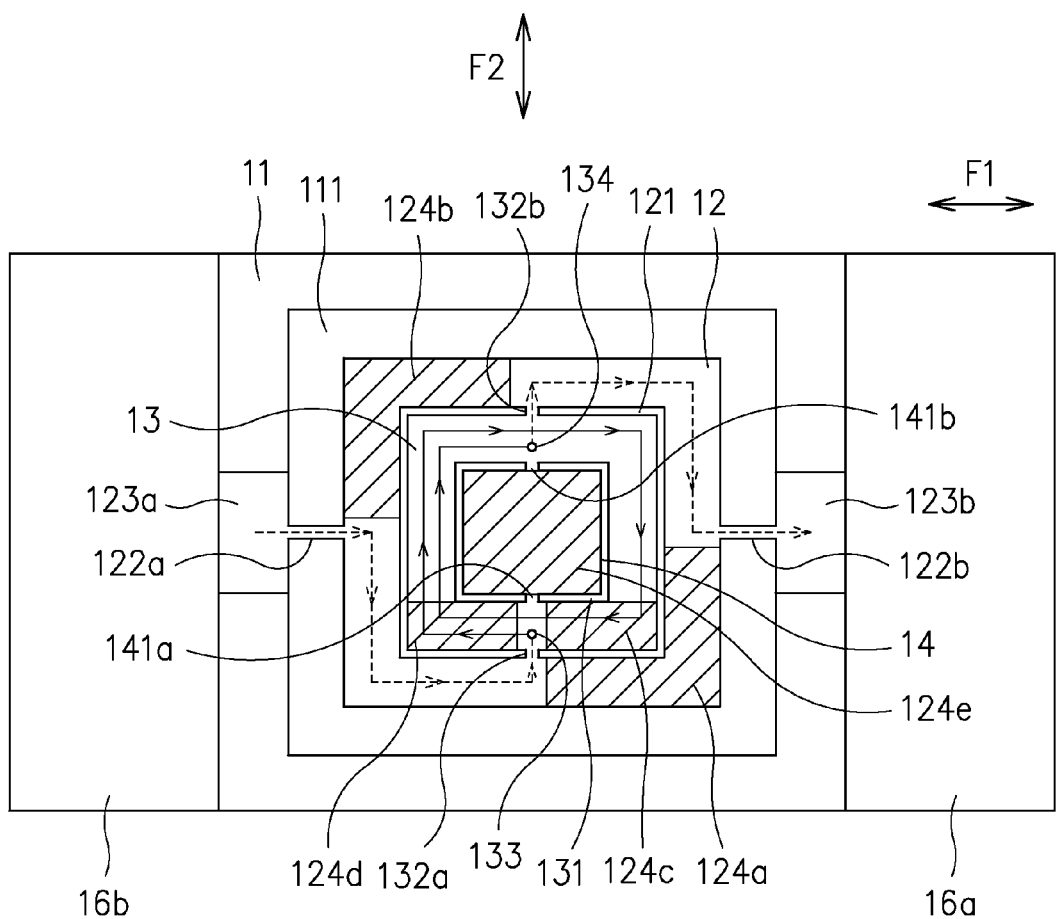
FIG. 2 is a top view of FIG. 1.

Please refer to FIG. 1 and FIG. 2, which show an optical multi-ring scanner according to a first embodiment of the present disclosure. As shown in FIG. 1 and FIG. 2, an optical multi-ring scanner 10 comprises: a substrate 11, an outer ring driving element 12, a first inner ring driver 13 and a mirror element 14.

The substrate 11, capable of being a silicon substrate, a metal substrate, a glass substrate or a circuit board, is structured with a first axial direction F1 and a second axial direction F2 that are perpendicular to each other, whereas the first axial direction F1 is defined to be the first scan axis of the optical multi-ring scanner 10 while the second axial direction F2 is defined to be the slow scan axis of the same. By representing the three-dimensional optical multi-ring scanner 10 using a Cartesian coordinate system, the first axial direction F1 is aligned parallel with the X axis while the second axial direction F2 is aligned parallel with the Y axis. Moreover, as shown in FIG. 1, the substrate 11 is further formed with a hollow section 111, and also there is a screw tube 15 disposed under the substrate 11 to be used for actuating the outer ring driving element 12.

In this embodiment, there is a layer of hard magnetic alloy film being electroplated on the surface of the outer ring driving element 12, whereas the outer ring driving element 12 is received inside the first hollow section 111. Moreover, the outer ring driving element 12, being formed with a second hollow section 121, has two first torsion arms 122a, 122b being respectively and symmetrically arranged at the two opposite sides of the outer ring driving element 12 while both being connected to the substrate 10 in a manner that each first torsion arm 122a, 122b is arranged extending in a first extending direction as the first extending direction is parallel to the first axial direction F1. In addition, the end of each of the two first torsion arms 122a, 122b that is connected to the substrate 11 is formed with an external electric connector 123a, 123b to be used for connecting to an external power source.

It is noted that there can be coil being formed on the first inner ring driver 13 by electroplating, whereas the first inner ring driver 13 is received inside the second hollow section 121. In FIG. 1, the first inner ring driver 13 is formed with a third hollow section 131, and has a pair of second torsion arms 132a, 132b symmetrically disposed at the two opposite sides of the first inner ring driver 13 while being connected to the outer ring driving element 12 in a manner that each second torsion arm 132a, 132b is arranged extending in a second extending direction as the second extending direction is parallel to the second axial direction F2.

The mirror element 14, which is coated with a reflection layer made of a metal such as gold, silver, aluminum, nickel or copper, is received inside the third hollow section 131 while having a pair of third torsion arms 141a, 141b symmetrically disposed at two opposite sides of the mirror element 14 in a manner that the pair of the third torsion arms 141a, 141b are disposed coaxial with the pair of the second torsion arms 132a, 132b while enabling each third torsion arm 141a, 141b to be connected to the inner ring driving element 13.

In addition, there are a first magnetic field and a second magnetic field with opposite magnetisms that are arranged outside the substrate 11, whereas the first magnetic field is originated from a first permanent magnet 16a, and the second magnetic field is originated from a second permanent magnet 16b, while the polarity of the first permanent magnet 16a is opposite to that of the second permanent magnet 16b; and the magnetic directions of both the first permanent magnet 16a and the second permanent magnet 16b are parallel with the first axial direction F1. Thereby, by the cooperation between the magnetisms of the first and the second permanent magnets 16a, 16b and the screw tube 15, the optical multi-ring scanner 10 can be actuated.

In this embodiment, the substrate 11, the outer ring driving element 12, the first inner ring driver 13, and the mirror element 14, the first torsion arms 121a, 121b, the second torsion arms 132a, 132b, and the third torsion arms 141a, 141b can all be made of the same material, but are separated from one another by the design of the manufacturing process. It is noted that they are usually made of a silicon material, such as monocrystalline silicon, polycrystalline silicon or SOI wafer, etc. On the other hand, they can be made of a common metal including copper, aluminum, steel; a magnetic material including nickel, iron, cobalt, or even a magnetic alloy including cobalt-nickel alloy, cobalt-nickel-manganese-phosphorous alloy. That is, the substrate 11, the outer ring driving element 12, the first inner ring driver 13, and the mirror element 14, the first torsion arms 121a, 121b, the second torsion arms 132a, 132b, and the third torsion arms 141a, 141b can all be made of a silicon material, a metal material, or they can be selectively made of silicon materials, metal materials and magnetic materials. As shown in FIG. 1, the outer ring driving element 12 is further comprised of: a metallic bottom electrode layer, an electroplated magnetic layer, and an insulation layer sandwiched between the metallic bottom electrode layer and the electroplated magnetic layer, while the inner ring driver 13 is further comprised of: a metallic bottom electrode layer, an electroplated metal coil, and an insulation layer sandwiched between the metallic bottom electrode layer and the electroplated metal coil. It is noted that the electroplated magnetic layer in the outer ring driving element 12 can be made of nickel or magnetic alloys such as cobalt-nickel alloy, iron-nickel alloy, cobalt-nickel-manganese-phosphorous alloy; the electroplated metal coil can be made of copper, aluminum, nickel, gold, silver, etc., and the insulation layer can be made of silicon dioxide or silicon nitride. Moreover, there is at least one via hole to be used for enabling electric conduction between the metallic bottom electrode layer and the electroplated magnetic layer in the outer ring driving element 12, and also between the metallic bottom electrode layer and the electroplated metal coil in the first inner ring driver 13. In addition, the metallic bottom electrode layer, being used as the conductive circuit, is formed by electroplating, vapor deposition, sputtering deposition, doping and the like, whereas it can be made of copper, aluminum, nickel, gold, silver, and so on.

Figure 3:
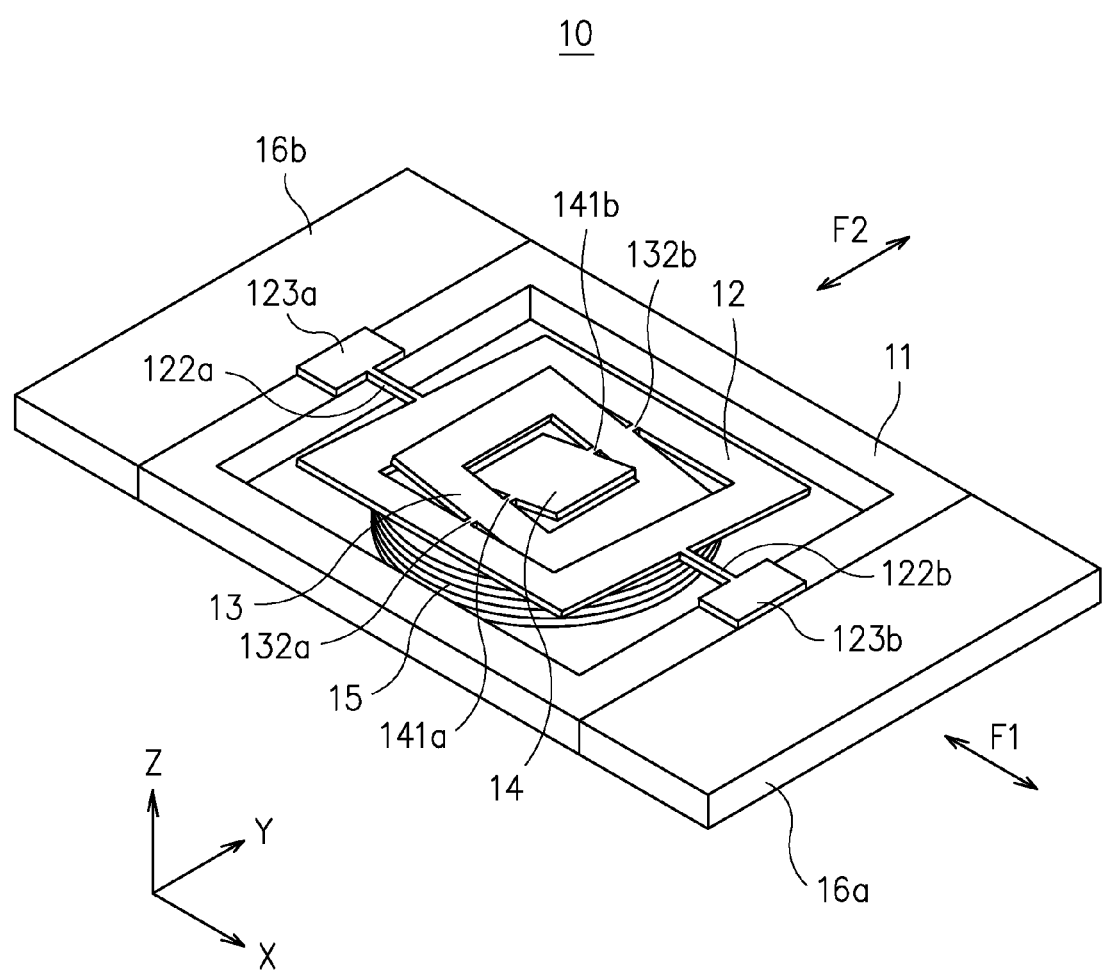
FIG. 3 is a schematic diagram showing how the optical multi-ring scanner of FIG. 1 is vibrating.

As shown in FIG. 2 and FIG. 3, the optical multi-ring scanner of the first embodiment is constructed to be driven by an electromagnetic force, which can be a Lorentz force or a magnetostatic force, and consequently, in one design of the aforesaid optical multi-ring scanner, its fast scan axis and the slow scan axis can be driven respectively by any one force selected from the Lorentz force and the magnetostatic force. It is noted that when the optical multi-ring scanner 10 is driven by dual electromagnetic forces, i.e. when the fast scan axis and the slow scan axis are driven respectively by the Lorentz force and the magnetostatic force, different driving manners with specifically designed vibration modes should be constructed with respect to the structural differences between the slow scan axis F1 and the fast scan axis F2 so as to achieve the optimal driving efficiency. As the fast scan axis F2 is primarily used for bringing along the inner most mirror element 14 to perform a fast scan operation in a horizontal direction, the conventional electromagnetic actuation design that the mirror element 14 is formed with the electroplated metal coil directly thereon for enabling the same to be driven by the Lorentz force can cause image distortion since the mirror element 14 can be deformed by the heat accumulated thereon that is directly resulted from the electroplated metal coil. Thus, in the optical multi-ring scanner of the present disclosure, the electroplated metal coil is constructed in the first inner ring driver 13 for preventing the aforesaid shortcoming In addition, as the first inner ring driver 13 is arranged coaxial with the mirror element 14, a special double ring structure can be constructed by the use of the first inner ring driver 13 and the outer ring driving element 12. Such double ring structure can be operate under certain specially designed resonant modes, including out-phase resonant mode, and in-phase resonant mode. Consequently, the mirror element 14 can be brought to move as soon as the first inner ring driver 13 is activated by a driving force, so that not only the scanning angle of the optical multi-ring scanner is enlarged, but also the temperature of the operating mirror element 14 is reduced. For the slow scan axis F1, it is primarily used for bringing along the outer most outer ring driving element 12 to perform a slow scan operation in a vertical direction. Thus, the outer ring driving element 12 should be driven in a low frequency manner. In the present disclosure, there is a layer of hard magnetic alloy film being electroplated on the surface of the outer ring driving element 12 while enabling the same to operate cooperatively with the screw tube that is charged with an alternating current of 60 Hz, by that the outer ring driving element 12 is actuated by the magnetostatic force.

For illustrating the flowing of current in the present disclosure, please refer to a path indicating by dotted arrows of FIG. 2. As shown in FIG. 2, the current flow starts from an external electric connector 123 a, and then is guided into an electric conductive layer that is formed by electroplating or doping, whereas the electric conductive layer is formed with electrical insulation areas. Thereafter, the current is guided to flow through the first torsion arm 122a and enters the metallic bottom electrode layer in the outer ring driving element 12, and then by the effect of the electrical insulation areas formed on the outer ring driving element 12, the current is further being guided to flow through the second torsion arm 132a and then enters the first inner ring driver 13 where the current is guided by a via hole 133 to flow upward to the electroplated metal coil in the first inner ring driver 13 and then is guided to flow along the coil in an outside-in manner. By the arrangement of the electrical insulation areas 124c, 124d, and 124e, the current can be ensured to flow through the electroplated metal coil in the first inner ring driver 13 without shortage. Thereafter, the current is guided by another via hole to flow downward to the metallic bottom electrode layers of the first inner ring driver 13 and the outer ring driving element 12, where similarly by the effect of the electrical insulation area 124b on the outer ring driving element 12, the current is guided to flow through the second torsion arm 122b and then to the external electric connector 123b. Thus, by the construction of the electrical insulation areas 124a, 124b, 124c, 124d, the metallic bottom electrode layers and the via holes 133, 134, a current path is formed flowing between the two electric connectors 123a, 123b, the electroplated metal coils inside the outer ring driving element 12, the first inner ring driver 13, and the mirror element 14 without causing any shortage.

It is noted that there are insulation layers sandwiched between the aforesaid metallic bottom electrode layers and their corresponding electroplated metal coils, so that the metallic bottom electrode layers can be insulated from contacting with the electroplated metal coils. Thus, the electric conduction between the metallic bottom electrode layers and the electroplated metal coils are only enabled through the via holes 133, 134. Moreover, the metallic bottom electrode layers can be formed by various means. For instance, it can be formed by the use of a depositing process for depositing metals including gold, aluminum, copper, nickel, silver, etc., or alloys including titanium-gold alloy, or even by a doping process for doping baron or phosphorous therein into a circuit.

In the first embodiment of the present disclosure, although the substrate 11, the outer ring driving element 12, the first inner ring driver 13, and the mirror element 14, the first torsion arms 121a, 121b, the second torsion arms 132a, 132b, and the third torsion arms 141a, 141b are all made of a silicon material, they can be configured and structured differently from the first embodiment, as those described in the following embodiments.

Figure 4:
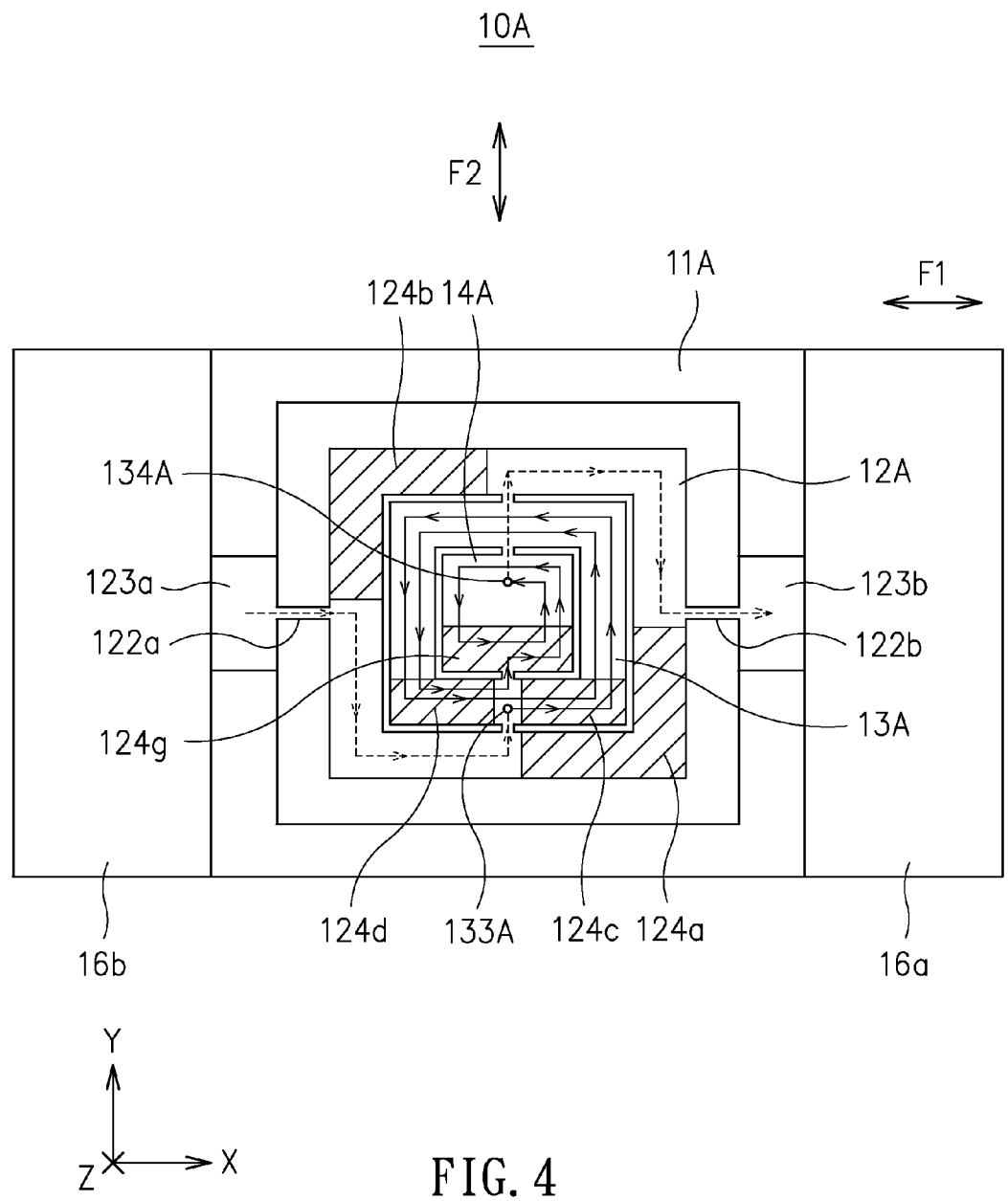
FIG. 4 is a three dimensional view of an optical multi-ring scanner according to a second embodiment of the present disclosure.

Please refer to FIG. 4, which is a three dimensional view of an optical multi-ring scanner according to a second embodiment of the present disclosure. Similarly, the optical multi-ring scanner 10A of FIG. 4 is also being designed to be driven by dual electromagnetic forces, as the one shown in the first embodiment, but is different in that in addition to coil formed on the first inner ring driver 13A, there are coil also being formed on the mirror element 14A. As shown in FIG. 4, the outer ring driving element 12A is further comprised of: a metallic bottom electrode layer, an electroplated magnetic layer, and an insulation layer sandwiched between the metallic bottom electrode layer and the electroplated magnetic layer, while the inner ring driver 13A is further comprised of: a metallic bottom electrode layer, an electroplated metal coil, and an insulation layer sandwiched between the metallic bottom electrode layer and the electroplated metal coil; and in addition, the mirror element 14A is further comprised of: a metallic bottom electrode layer, an electroplated metal coil, and an insulation layer sandwiched between the metallic bottom electrode layer and the electroplated metal coil; It is noted that the electroplated magnetic layer in the outer ring driving element 12A can be made of nickel or magnetic alloys such as cobalt-nickel alloy, iron-nickel alloy, cobalt-nickel-manganese-phosphorous alloy; the electroplated metal coil can be made of copper, aluminum, nickel, gold, silver, etc., and the insulation layer can be made of silicon dioxide or silicon nitride. It is noted that the first inner ring driver 13A and the mirror element 14A are used for driving the fast scan axis (as the second axis direction F2), while the outer ring driving element 12A is used for driving the fast scan axis (as the first axial direction F1). Moreover, there is at least one via hole to be used for enabling electric conduction between the metallic bottom electrode layers and the electroplated magnetic layers In addition, the metallic bottom electrode layer, being used as the conductive circuit, is formed by electroplating, vapor deposition, sputtering deposition, doping and the like, whereas it can be made of copper, aluminum, nickel, gold, silver, and so on. As shown in FIG. 4, the current flow starts from an external electric connector 123a, and then is guided to flow through the first torsion arm 122a and enters the metallic bottom electrode layer of the outer ring driving element 12A. Then, the current is guided to flow through a via hole 133A and then enters the electroplated metal coils of the first inner ring driver 13A and the mirror element 14A following the dotted arrows. Thereafter, it is further guided by another via hole 134A and then enters metallic bottom electrode layers of the mirror element 14A, the first inner ring driver 13A and the outer ring driving element 12A, where the current is guided to flow through the second torsion arm 122b and then to another external electric connector 123b. By the arrangement of the electrical insulation areas 124a, 124b, 124c, 124d, and 124g, as well as the metallic bottom electrode layers and the via holes 133A, 134A, a current path is formed flowing between the two electric connectors 123a, 123b, the electroplated metal coils in the outer ring driving element 12A, the first inner ring driver 13A and the mirror element 14A without causing any shortage.

Figure 5:
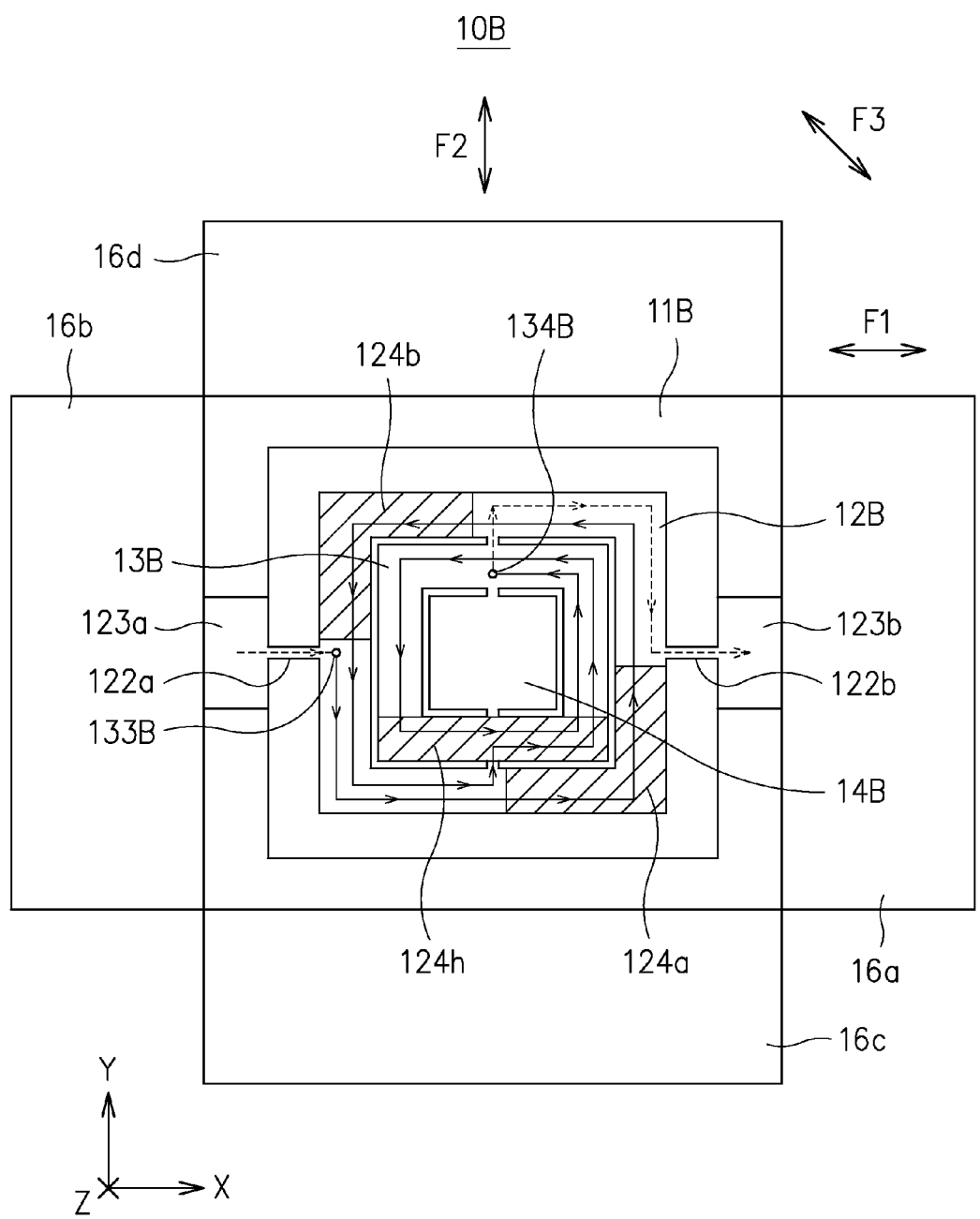
FIG. 5 is a three dimensional view of an optical multi-ring scanner according to a third embodiment of the present disclosure.

In a third embodiment shown in FIG. 5, the optical multi-ring scanner 10b has a pair of first permanent magnets 16a, 16c, of the same polarity that are arranged next to each other, another pair of second permanent magnets 16b, 16d of the same polarity that are also arranged next to each other; while the polarities of the first permanent magnets 16a, 16c are opposite to those of the second permanent magnets 16b, 16d. In this embodiment, the polarities of the first permanent magnets 16a, 16c are defined to be S polarity while the polarities of the second permanent magnets 16b, 16d are defined to be N polarity. As shown in FIG. 5, by the arrangement of the first permanent magnets 16a, 16c and the second permanent magnets 16b, 16d, an inclined magnetic direction F3 is caused, which neighbor parallel to the first axial direction F1, nor to the second axial direction F2. Moreover, the outer ring driving element 12B and the first inner ring driver 13B are respectively embedded with metallic bottom electrode layers and electroplated metal coils. Similarly, the electroplated metal coils are made of copper, aluminum, nickel, gold, and silver, etc. It is noted that the first inner ring driver 13B is used for driving the fast scan axis (as the second axis direction F2), while the outer ring driving element 12B is used for driving the fast scan axis (as the first axial direction F1), that they are actuated without any involvement of magnetic alloys relating to their operation principle and structures. That is, there will be no such structures as the electroplated magnetic layers required in the optical multi-ring scanner of the present embodiment, and consequently, the screw tube 15 used in the embodiments shown in FIG. 1 and FIG. 4 is also not required. Moreover, as there is an insulation layer formed between the metallic bottom electrode layer and electroplated metal coil, the electric conduction between the metallic bottom electrode layer and electroplated metal coil can only be enabled through via holes. It is noted that the insulation layer is made of silicon dioxide or silicon nitride. In addition, the metallic bottom electrode layer, being used as the conductive circuit, is formed by electroplating, vapor deposition, sputtering deposition, doping and the like, whereas it can be made of copper, aluminum, nickel, gold, silver, and so on. Accordingly, the optical multi-ring scanner is characterized in that: it is designed to be driven purely and only by Lorentz force. As shown in FIG. 5, the current flow starts from an external electric connector 123a, and then is guided to flow into the metallic bottom electrode layer in the substrate 11B where it is further being guided to flow through the first torsion arm 122a and enters the outer ring driving element 12B. Then, the current is guided to flow through a via hole 133B and then enters the electroplated metal coils of the first inner ring driver 13B and the outer ring driving element 12B, following the solid arrows. Thereafter, it is further guided by another via hole 134B and then enters metallic bottom electrode layers of the first inner ring driver 13B, following the dotted arrows, where it is being guided to flow through the second torsion arm 122b and finally reaches the external electric connector 123b. Similarly, by the arrangement of the electrical insulation areas 124a, 124b, and 124h, as well as the metallic bottom electrode layers and the via holes 133B, 134B, a current path is formed flowing between the two electric connectors 123a, 123b, the electroplated metal coils in the outer ring driving element 12B, the first inner ring driver 13B and the mirror element 14B without causing any shortage.

Figure 6:
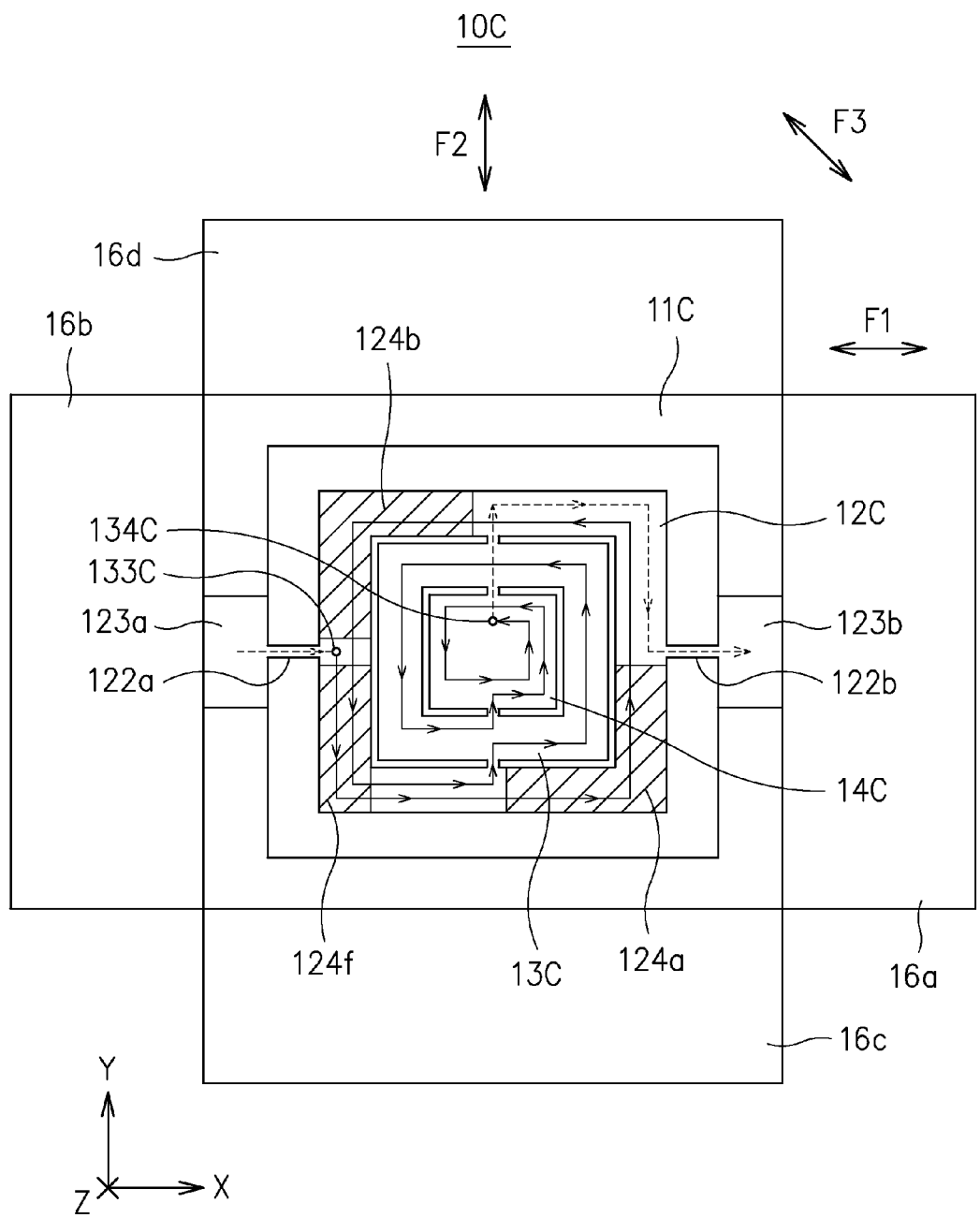
FIG. 6 is a three dimensional view of an optical multi-ring scanner according to a fourth embodiment of the present disclosure.

Please refer to FIG. 6, which is a three dimensional view of an optical multi-ring scanner according to a fourth embodiment of the present disclosure. The optical multi-ring scanner 10C of FIG. 6 is structured similar to the third embodiment shown in FIG. 5, but is characterized in that: all the outer ring driving element 12C, the first inner ring driver 13C and the mirror element 14C are respectively configured with electroplated metal coils and metallic bottom electrode layers, whereas the electroplated metal coils can be made of copper, aluminum, nickel, gold or silver, etc. Thereby, the first inner ring driver 13C and the mirror element 14C are used for driving the fast scan axis (as the second axis direction F2), while the outer ring driving element 12C is used for driving the fast scan axis (as the first axial direction F1), in that although the driving efficiency of the fast scan axis is enhanced by the use of the additional mirror element 14C that is assisted by the first inner ring driver 13C, the total number of coils being formed on the mirror element 14C should be decreased for compensating the mirror element 14C from deformation caused by the heat accumulation resulting from the operating coils. Similarly, both the fast and the slow scan axes are actuated without any involvement of magnetic alloys relating to their operation principle and structures. Moreover, as there is an insulation layer formed between the metallic bottom electrode layer and electroplated metal coil, the electric conduction between the metallic bottom electrode layer and electroplated metal coil can only be enabled through via holes. It is noted that the insulation layer is made of silicon dioxide or silicon nitride. In addition, the metallic bottom electrode layer, being used as the conductive circuit, is formed by electroplating, vapor deposition, sputtering deposition, doping and the like, whereas it can be made of copper, aluminum, nickel, gold, silver, and so on. Accordingly, the optical multi-ring scanner is designed to be driven purely and only by Lorentz force. As shown in FIG. 6, the current flow starts from an external electric connector 123a, and then is guided to flow into the metallic bottom electrode layer in the substrate 11C, where it is further being guided to flow through the first torsion arm 122a and enter the outer ring driving element 12C. Then, the current is guided to flow upward through a via hole 133C and then enters the electroplated metal coils of the outer ring driving element 12C, the first inner ring driver 13C and the mirror element 14C, following the dotted arrows. Thereafter, it is further guided by another via hole 134C and then enters the metallic bottom electrode layer inside the mirror element 14C, also following the dotted arrows, through which the current is guided to flow through the second torsion arm 122b and then to another external electric connector 123b. By the arrangement of the electrical insulation areas 124a, 124b, and 124f, as well as the metallic bottom electrode layers and the via holes 133C, 134C, a current path is formed flowing between the two electric connectors 123a, 123b, and the electroplated metal coils in the outer ring driving element 12C, the first inner ring driver 13C and the mirror element 14C without causing any shortage.

With respect to the aforesaid embodiment and referencing to FIG. 1, the substrate can be made of silicon, the outer ring driving element 12, the first inner ring driver 13 and the mirror element 14 are all respectively configured with a metallic bottom electrode layer, while the outer ring driving element 12, the first inner ring driver 13, the mirror element 14, the first torsion arms 122a, 122b, the second torsion arms 132a, 132b, the third torsion arms 141a, 141b cam all be made of a common metal including copper, aluminum, steel; a magnetic material including nickel, iron, cobalt, or even a magnetic alloy including cobalt-nickel alloy, cobalt-nickel-manganese-phosphorous alloy. Accordingly, there can be four different structures for the optical multi-ring scanner of the present disclosure, as described in the following:

(a) The outer ring driving element 12 is formed with an additional electroplated magnetic layer, that can be made of a material selected from the group consisting of: nickel, magnetic alloys such as cobalt-nickel alloy, iron-nickel alloy, cobalt-nickel-manganese-phosphorous alloy; and moreover, there is a layer of electroplated metal coil formed on the first inner ring driver 13 which can be made of copper, aluminum, nickel, gold, and silver, etc., by that a current path can be achieved as the one shown in FIG. 2.

(b) The outer ring driving element 12 is formed with an additional electroplated magnetic layers, that can be made of a material selected from the group consisting of: nickel, magnetic alloys such as cobalt-nickel alloy, iron-nickel alloy, cobalt-nickel-manganese-phosphorous alloy; and moreover, both the first inner ring driver 13 and the mirror element are respectively formed with a layer of electroplated metal coil which can be made of copper, aluminum, nickel, gold, and silver, etc., by that a current path can be achieved as the one shown in FIG. 4.

(c) The outer ring driving element 12 and the first inner ring driver 13 are both formed with a layer of electroplated metal coil which can be made of copper, aluminum, nickel, gold, and silver, etc., by that a current path can be achieved as the one shown in FIG. 5.

(d) The outer ring driving element 12, the first inner ring driver 13 and the mirror element 14 are all formed with a layer of electroplated metal coil which can be made of copper, aluminum, nickel, gold, and silver, etc., by that a current path can be achieved as the one shown in FIG. 6.

It is noted that, in the outer ring driving element 12, the first inner ring driver 13 and the mirror element 14, there will insulation layers being formed and sandwiched between their corresponding electroplated magnetic layers and electroplated metal coils.

From the foregoing descriptions relating to those different embodiments, it is noted that the optical multi-ring scanner of the present disclosure can be constructed as a device being actuated only by Lorentz force or a device being actuated by dual electromagnetic forces, based upon the material used in the optical multi-ring scanner in associated with the structural design of the electroplated magnetic layer, the electroplated metal coil and the metallic bottom electrode layer. To sum up, when the optical multi-ring scanner is constructed as a device being actuated only by Lorentz force, the forces for driving the outer ring driving element 12, the first inner ring driver 13 and the mirror element 14 are all resulting from their corresponding electroplated metal coils; on the other hand, when the optical multi-ring scanner is constructed as a device being actuated only by magnetostatic force, all the outer ring driving element 12, the first inner ring driver 13 and the mirror element 14 should be formed with a electroplated magnetic layer in respective. Nevertheless, the driving forces for the optical multi-ring scanner of the present disclosure are not restricted thereby, they can be electrostatic force, piezoelectric force or thermoelectric force.

Figure 7:
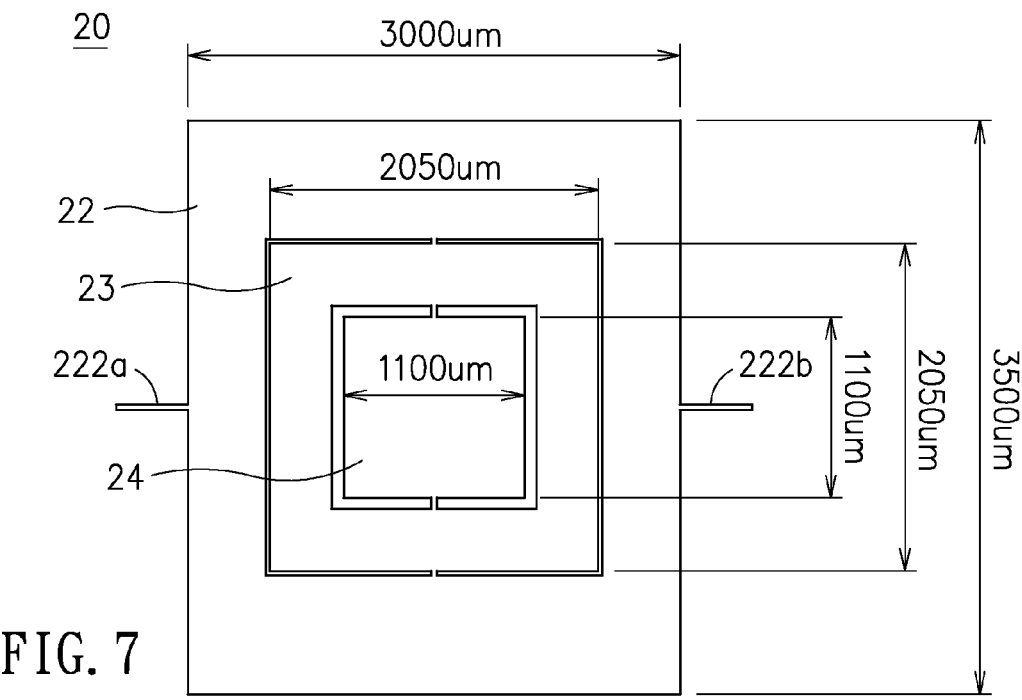
FIG. 7 is a top view of the optical multi-ring scanner of FIG. 1 with the measurements of its actual dimensions.
Figure 8:
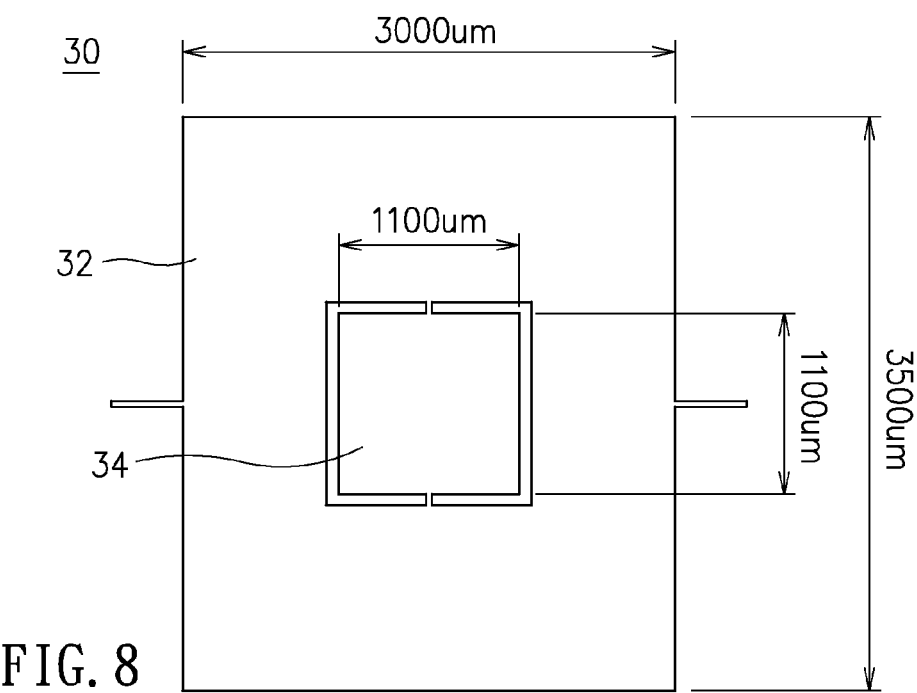
FIG. 8 is a top view of a conventional scanner of single-ring structure with the measurements of its actual dimensions.

Please refer to FIG. 7 and FIG. 8, which are used for comparing the optical multi-ring scanner of the present disclosure with a conventional scanner of single-ring structure. The optical multi-ring scanner 20 shown in FIG. 7 is a scanner of double-ring structure, in which the dimension of the outer ring driving element 22 is 3000×3500 um, the dimension of the first inner ring driver 23 is 2050×2050 um, and the dimension of the mirror element is 1100×1100 um, while the overall structure thickness including its torsion axes is 30 um. The device 30 shown in FIG. 8 is a scanner of single-ring structure, in which he dimension of the single-ring driver 32 is 3000×3500 um and the dimension of the mirror element 34 is 1100×1100 um, while the overall structure thickness including its torsion axes is 30 um. That is, the outer rings and the mirror elements for both the optical multi-ring scanner 20 shown in FIG. 7 and the conventional scanner of single-ring structure 30 shown in FIG. 8 are of the same size and that is also true relating to their overall structure thicknesses, by that the two scanners can be compared using a finite element analysis software, i.e. ANSYS. When ANSYS is used for simulating the resonant frequencies and the scanning angles for the aforesaid two scanners 20, 30, the factors that are taking into account includes the driving area the mirror size and the driving frequency. After proper structural adjustment for enabling the resonant frequencies of both the optical multi-ring scanner 20 and the scanner of single-ring structure 30 to be 22.5 kHz, a comparison relating to their scanning angles can be performed, in that the resonant frequency relating to the fast scan axis and the slow scan axis of the optical multi-ring scanner 20 are 22494 Hz and 1046 Hz. The comparison starts by subjecting an electromagnetic force only upon the outer ring or the inner ring, by that an evaluation for determining the effectiveness of the addition first inner ring driver 23 comparing with the scanner of single-ring structure 30 that has no inner ring. Wherein, the parameters for calculating the electromagnetic force includes: central magnetic field density B=0.15 T; current I=0.1 A; wire width=10 um; and pitch between wires=10 um. Thereby, the total number of coils N can be acquired by dividing the width of the first inner ring driver 23 or that of the outer ring driving element 22 by the sum of the wire width and the pitch, which is about 18 in this embodiment. The formula of Lorentz force is: F=N×I×L×B, by that the actual Lorentz force working on the first inner ring driver can be obtained. Thereafter, by dividing the obtained Lorentz force with a trapezoid area that is corresponding to the first inner ring driver 23 and the outer ring driving element 22, a pressure working on the first inner ring driver 23 and the outer ring driving element 22 can be obtained, i.e. P=1500 pa in this embodiment. Using the so-obtained pressure in a harmonic analysis performed by ANSYS while setting a damping value to be smaller than 0.002, the result is as following: while only the first inner ring driver 23 is subjected to the Lorentz force, the mechanic angle θ is ±13°; and while only the outer ring driving element 22 is subjected to the Lorentz force, the mechanic angle θ is ±0.8°. Therefore, it is concluded that under the same forcing condition and equivalent area, the first inner ring driver 23 can perform better than the outer ring driving element 22. It is because that under the resonant mode, when the force is exerting on the left and the right sides of the outer ring driving element 22 at positions close to the two first torsion arms 222a, 222b, the outer ring driving element 22 will not be twisted as easy as when the force is exerted on the top and bottom of the same, so that the displacement as well as the deformation is not obvious; however, in comparison, the displacement of the first inner ring driver 23 is larger. Thus, the force working upon the first inner ring driver 23 will comparatively cause the mirror element 24 to move by a larger displacement.

In an analysis performed only on the conventional scanner of single-ring structure 30 shown in FIG. 8, the dimensions of the first torsion arms 322a, 322b of the single-ring driver 32 are fine tuned for acquiring the scanning angle of 22.5 kHz. Thereby, under the same forcing condition, the mechanic angle of the scanner of single-ring structure 30 θ is ±3.5°. Accordingly, it is concluded that the force exerting upon the single-ring driver 32 of the conventional scanner of single-ring structure 30 is not capable of efficiently bringing along the mirror element 34 to move since the rigidity of the single-ring driver 32 may be too larger to overcome.

Figure 9:
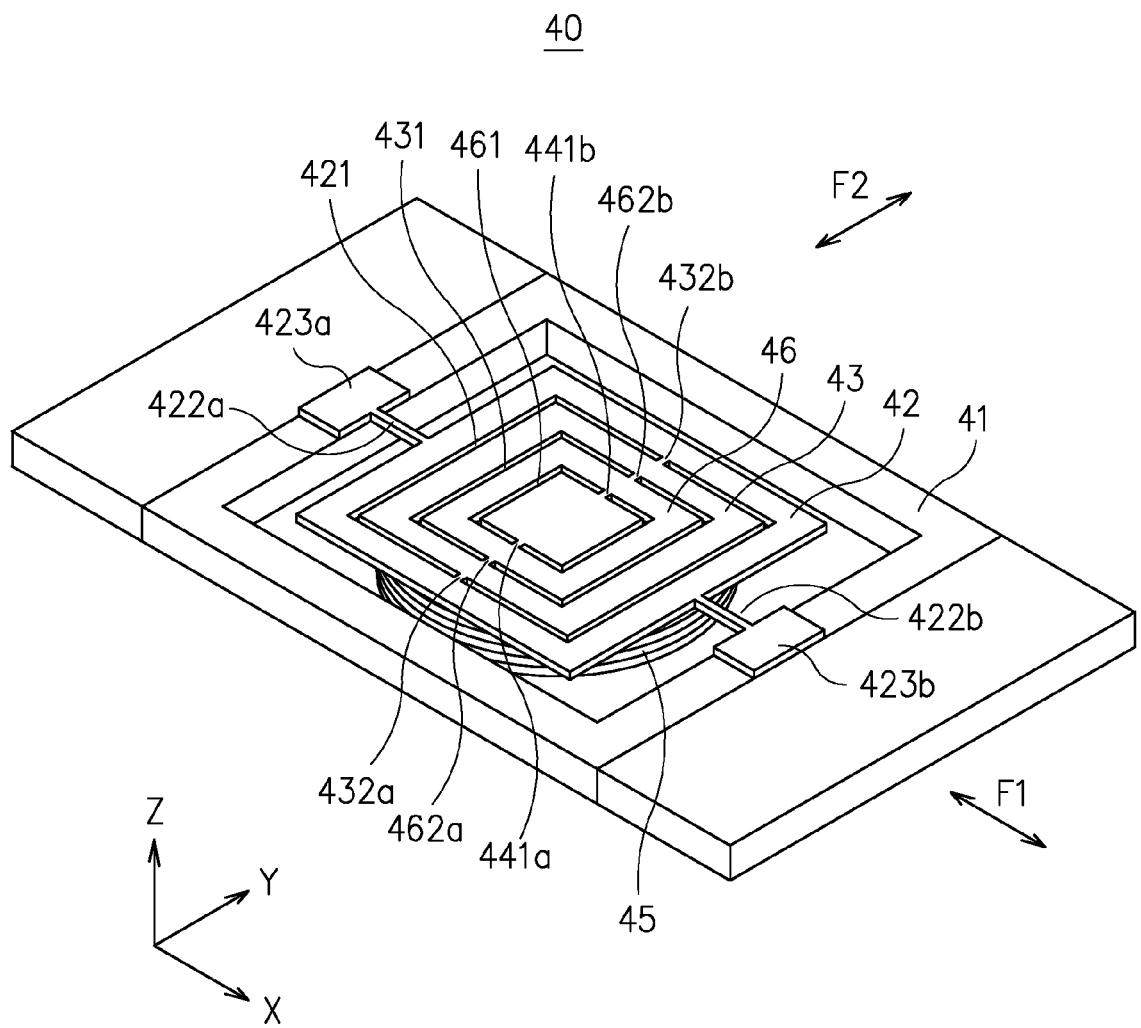
FIG. 9 is a three dimensional view of an optical multi-ring scanner according to a fifth embodiment of the present disclosure.

In addition, considering the thermal effect resulting from the electroplated metal coil formed on the mirror element may severely affected the performance of the scanner, the solution for the conventional scanner of single-ring structure 30 shown in FIG. 8 is to wire the coil on its single-ring driver 32. However, such conventional solution will generate a large-area double-layered coil with a resistance as high as 150Ω to 200Ω, which can cause larger power consumption. On the other hand, the solution provided in the double-ring structure of the present disclosure, as the one shown in FIG. 7, is to wrap the coil on the first inner ring driver 23, by that the resulting coil will have comparatively smaller area and with lower resistance of about 50Ω, and consequently the power consumption is lower. From a simulation for comparing the heat generated from the optical multi-ring scanner 20 and the conventional scanner of single-ring structure 30, it is noted that the temperature measured from the mirror element 34 of the conventional scanner of single-ring structure 30 is about 180° C., while the temperature measure from the mirror element 24 of the optical multi-ring scanner 20 is about 105° C. Thus, it is proved that the mirror element 24 of the optical multi-ring scanner 20 of the present disclosure can be effectively reduced. Please refer to FIG. 9, which is a three dimensional view of an optical multi-ring scanner according to a fifth embodiment of the present disclosure. The optical multi-ring scanner 40 of the fifth embodiment is structured similarly to the one shown in the first embodiment, but is different in that: the optical multi-ring scanner 10 adopts a double-ring structure, but the optical multi-ring scanner 40 adopts a triple-ring structure. As shown in FIG. 9, the optical multi-ring scanner 40 is comprised of: a substrate 41, configured with a first hollow section; an outer ring driving element 42, configured with a second hollow section while being received inside the first hollow section; a first inner ring driver 43, configured with a third hollow section while being received inside the second hollow section; a second inner ring driver 46 configured with a fourth hollow section while being received inside the third hollow section; a mirror element 44 being received inside the fourth hollow section; and a screw tube 45 disposed under the substrate 41, wherein the outer ring driving element 42 further has two first torsion arms 422a, 422b being respectively and symmetrically arranged at the two opposite sides of the outer ring driving element 42 while both being connected to the substrate 41 in a manner that each first torsion arm 422a, 422b is arranged parallel to the first axial direction F1, i.e. the fast scan axis; the first inner ring driver 43 further has a pair of second torsion arms 432a, 432b symmetrically disposed at the top and bottom sides of the first inner ring driver 43 while being connected to the outer ring driving element 42 in a manner that each second torsion arm 432a, 432b is arranged parallel to the second axial direction F2, i.e. the slow scan axis; the second inner ring driver 46 further has a pair of fourth torsion arms 462a, 462b symmetrically disposed at the top and bottom sides of the second inner ring driver 46 while being connected to the first inner ring driver 43 in a manner that each fourth torsion arm 462a, 462b is arranged parallel to the second axial direction F2, i.e. the slow scan axis; and the mirror element 44 has a pair of third torsion arms 441a, 441b symmetrically disposed at the top and bottom sides of the mirror element 44 while being connected to the second inner ring driver 46 in a manner that each third torsion arm 441a, 441b is arranged parallel to the second axial direction F2, i.e. the slow scan axis; and moreover, the second torsion arms 432a, 432b, the fourth torsion arms 462a, 462b and the third torsion arms 441a, 441b are arranged coaxial with each other.

Figure 10:
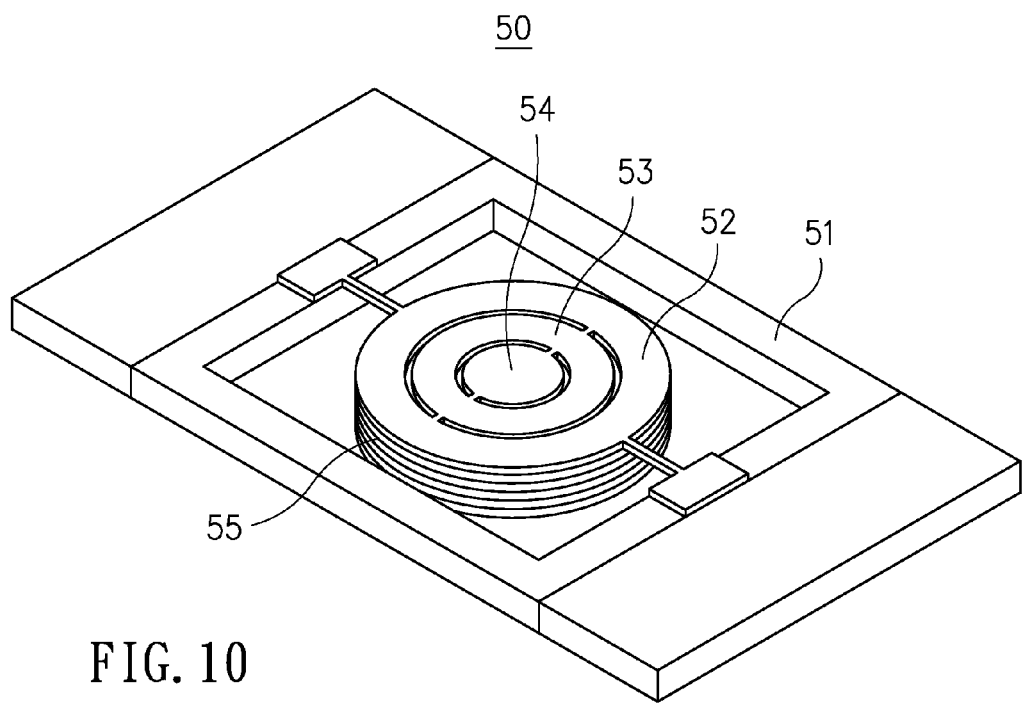
FIG. 10 is a three dimensional view of an optical multi-ring scanner according to a sixth embodiment of the present disclosure.

Please refer to FIG. 10, which is a three dimensional view of an optical multi-ring scanner according to a sixth embodiment of the present disclosure. The optical multi-ring scanner 50 of the sixth embodiment is structured similarly to the one shown in the first embodiment. As shown in FIG. 10, the optical multi-ring scanner 50 is comprised of: a substrate 51; an outer ring driving element 52; a first inner ring driver 53; a mirror element 54; and a screw tube 55 arranged under the substrate 51. It is noted that the optical multi-ring scanner 50 is characterized in that: all the outer ring driving element 52, the first inner ring driver 53 and the mirror element 51 are shaped as a disc.

Figure 11:
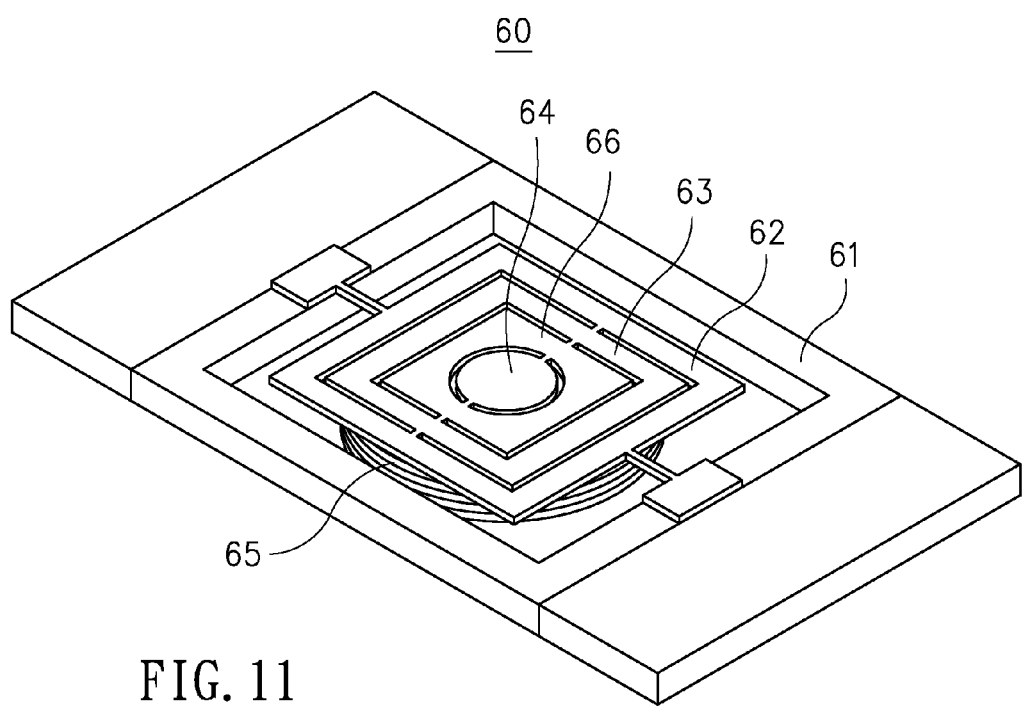
FIG. 11 is a three dimensional view of an optical multi-ring scanner according to a seventh embodiment of the present disclosure.
Figure 12:
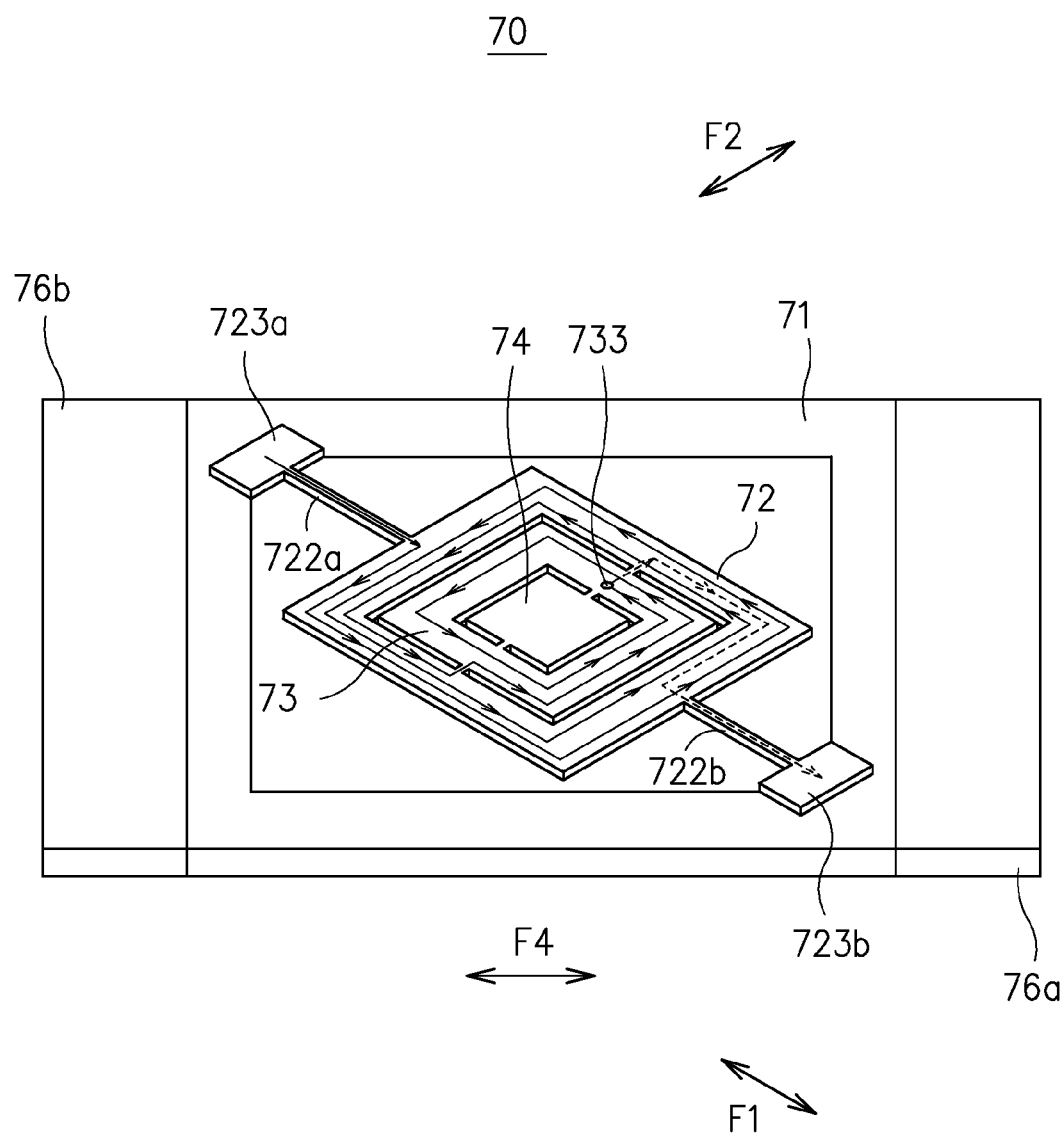
FIG. 12 is a three dimensional view of an optical multi-ring scanner according to an eighth embodiment of the present disclosure.

Please refer to FIG. 11, which is a three dimensional view of an optical multi-ring scanner according to a seventh embodiment of the present disclosure. The optical multi-ring scanner 60 of the seventh embodiment is structured as a combination of the embodiments shown in FIG. 9 and FIG. 10. As shown in FIG. 11, the optical multi-ring scanner 50 is comprised of: a substrate 61; an outer ring driving element 62; a first inner ring driver 63; a second inner ring driver 66; a mirror element 64; and a screw tube 65 arranged under the substrate 61. Moreover, the optical multi-ring scanner 60 is characterized in that: all the outer ring driving element 62, the first inner ring driver 63, and the second inner ring driver 66 are shaped as a rectangular while the mirror element 64 is shaped like a disc. Please refer to FIG. 12, which is a three dimensional view of an optical multi-ring scanner according to an eighth embodiment of the present disclosure. As shown in FIG. 12, the optical multi-ring scanner 70 comprises: a substrate 71; an outer ring driving element 72; a first inner ring driver 73; a mirror element 74; a first permanent magnet 76a and a second permanent magnet 76b. In addition, the outer ring driving element is configured with two external electric connectors 723a, 723b and two first torsion arms 722a, 722b, whereas the two first torsion arms 722a, 722b are arranged at the two opposite sides of the outer ring driving element 72. Moreover, the substrate 71, the outer ring driving element 72, the first inner ring driver 73 and the mirror element 74 are inclining arranged by an angle. It is noted that they can be inclined by an angle of 45 degrees, but is not limited thereby. The substrate 71 is structured with a first axial direction F1 and a second axial direction F2 that are perpendicular to each other, whereas first axial direction F1 are defined to be the flow scan axis while second axial direction F2 are defined to be the fast scan axis. Accordingly, each of the two first torsion arms 722a, 722b is arranged extending in a first extending direction as the first extending direction is parallel to the first axial direction; and there are magnetic directions F4 resulting each of the first permanent magnet 76a and the second permanent magnet 76b that are neither parallel with nor perpendicular to the first axial direction F1, while simultaneously also neither parallel with nor perpendicular to the second axial direction F2. Thereby, as the first embodiment shown in FIG. 1 and the second embodiment shown in FIG. 4 that when the electroplated magnetic layer coated on the outer ring driving element 72 is made of a magnetic material like nickel, instead of a hard magnetic alloy, the magnet field components in the first axial direction F1 and the second axial direction F2. that are originated respectively from the first permanent magnet 76a and the second permanent magnet 76b will be used for generating magnetic forces in the fast and the slow scan axes. Similarly, as the third embodiment shown in FIG. 5 and the fourth embodiment shown in FIG. 6 that when the outer ring driving element 72 is electroplated with metal coils and there are included angles formed between the substrate 71 with respect to the first axial direction F1 and the second axial direction F2 that are not 0 degree or 90 degrees, only the first permanent magnet 76a and the second permanent magnet 76b will be sufficient, as those shown in FIG. 12, and there will be no need for having the first permanent magnet 16a, 16c and the second permanent magnet 16d, 16d to be arranged in the optical multi-ring scanner, by that the size of the optical multi-ring scanner can be further miniaturized.

Similarly, the embodiments shown in FIG. 1 to FIG. 11 can all be applicable to the 45-degree-inclination arrangement shown in FIG. 12.

From the various embodiments described hereinbefore, the optical multi-ring scanner can be a device of double-ring structure, a device of triple-ring structure, or a device of more-than-three-ring structure, and so on; and the same time that there is no restriction relating to the shapes of its outer ring driving element, inner ring driver, and mirror element, which can be formed as a disc, a rectangular, a polygons, etc. and they are not required to be formed of the same shape. Nevertheless, no matter how many inner rings there are or how the shapes of the components are varied, the designing principle of the present disclosure is that: the inner ring driver should be coaxially arranged with the torsion arms of the mirror element.

To sum up, the optical multi-ring scanner of the present disclosure is different from those conventional scanners in structure, in effectiveness and in cost as following:

(1) The optical multi-ring scanner is featured by its unique multi-ring structure, by which when its fast scan axis is situated in a resonant mode and the electroplated metal coil form on the inner ring is charged with current, the scanning angle relating to the fast scan axis, i.e. the mirror element, can be enlarged through the operation of the multi-ring structure.

(2) As there are metallic bottom electrode layers formed in the optical multi-ring scanner, only a single layer of coils is required and sufficient for generating required driving force, by that not only the manufacturing yield can be enhanced greatly since the structural complexity of the optical multi-ring scanner is reduced, but also the manufacturing cost is decreased.

(3) In the optical multi-ring scanner of the present disclosure, the mirror deformation commonly seen in prior arts can be avoided since the temperature of the mirror element is reduced effectively by enabling the inner ring to function as a heat buffering layer for cooling down the mirror element, and thus the image distortion as well as the reliability of the optical multi-ring scanner are enhanced.

(4) Since there is no magnet being configured on the micromirrors, the resonant frequency as well as the reliability of the micromirror can be prevented from being adversely affected thereby.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. An optical multi-ring scanner, comprising:
   a substrate, formed with a first hollow section while being structured with a first axial direction and a second axial direction that are perpendicular to each other;
   an outer ring driving element, formed with a second hollow section while being receiving inside the hollow section, the outer ring driving element further having two first torsion arms being respectively and symmetrically arranged at the two opposite sides of the outer ring driving element while both being connected to the substrate in a manner that each first torsion arm is arranged extending in a first extending direction as the first extending direction is parallel to the first axial direction;
   at least one inner ring driving element, each configured with a first inner ring driver in a manner that each first inner ring driver is formed with a third hollow section while being received inside the second hollow section, and each first inner ring driver further having a pair of second torsion arms symmetrically disposed at the two opposite sides of the first inner ring driver while being connected to the outer ring driving element in a manner that each second torsion arm is arranged extending in a second extending direction as the second extending direction is parallel to the second axial direction; and
   a mirror element, disposed inside the third hollow section while having a pair of third torsion arms symmetrically disposed at two opposite sides of the mirror element in a manner that the pair of the third torsion arms are disposed coaxial with the pair of the second torsion arms while enabling each third torsion arm to be connected to the inner ring driving element.

2. The optical multi-ring scanner of claim 1, wherein the first axial direction of the substrate is defined to be the first scan axis of the optical multi-ring scanner while the second axial direction of the substrate is defined to be the slow scan axis of the optical multi-ring scanner.

3. The optical multi-ring scanner of claim 1, wherein the substrate is selected from the group consisting of: a silicon substrate, a metal substrate, a glass substrate and a circuit board.

4. The optical multi-ring scanner of claim 1, capable of being constructed for enabling the same to be driven by a driving force selected from the group consisting of: an electromagnetic force, an electrostatic force, a piezoelectric force and a thermoelectric force.

5. The optical multi-ring scanner of claim 4, wherein the electromagnetic force can be a Lorentz force or a magnetostatic force, and consequently the fast scan axis and the slow scan axis can be driven respectively by any one force selected from the Lorentz force and the magnetostatic force.

6. The optical multi-ring scanner of claim 1, wherein there are a first magnetic field and a second magnetic field with opposite magnetisms that are arranged outside the substrate.

7. The optical multi-ring scanner of claim 6, wherein the first magnetic field is originated from at least one first permanent magnet, and the second magnetic field is originated from at least one second permanent magnet, while the polarity of the at least one first permanent magnet is opposite to that of the at least one second permanent magnet.

8. The optical multi-ring scanner of claim 7, wherein the magnetic directions of both the at least one first permanent magnet and the at least one second permanent magnet are parallel with the first axial direction.

9. The optical multi-ring scanner of claim 7, wherein the magnetic directions of both the at least one first permanent magnet and the at least one second permanent magnet are arranged in a direction that is neighbor parallel nor perpendicular with the first axial direction and also is not neighbor parallel nor perpendicular with the second axial direction.

10. The optical multi-ring scanner of claim 1, wherein the substrate, the outer ring driving element, the first inner ring driver, and the mirror element, the first torsion arms, the second torsion arms, and the third torsion arms are all made of silicon.

11. The optical multi-ring scanner of claim 10, wherein the outer ring driving element is further comprised of: a metallic bottom electrode layer, an electroplated magnetic layer, and an insulation layer sandwiched between the metallic bottom electrode layer and the electroplated magnetic layer; each inner ring driver is further comprised of: a metallic bottom electrode layer, an electroplated metal coil, and an insulation layer sandwiched between the metallic bottom electrode layer and the electroplated metal coil; the end of each first torsion arm that is connected to the substrate is formed with an external electric connector to be used for connecting to an external power source; one component selected from the group consisting of: the outer ring driving element, the first inner ring driver, the mirror element and the combination thereof, is configured with at least one via hole to be used for enabling electric conduction between the metallic bottom electrode layer and the electroplated magnetic layer in the outer ring driving element, and between the metallic bottom electrode layer and the electroplated metal coil in the first inner ring driver; and, by the construction of the metallic bottom electrode layer and the electroplated magnetic layer in the outer ring driving element, and the metallic bottom electrode layer and the electroplated metal coil in the first inner ring driver, as well as the at least one via hole and the insulation layers, a current path is formed flowing between the outer ring driving element, the first inner ring driver, the mirror element and the two external electric connectors without causing any shortage.

12. The optical multi-ring scanner of claim 11, wherein the electroplated magnetic layers are made of a material selected from the group consisting of: nickel, magnetic alloys such as cobalt-nickel alloy, iron-nickel alloy, cobalt-nickel-manganese-phosphorous alloy; the electroplated metal coils and the metallic bottom electrode layers are made of a material selected from the group consisting of: copper, aluminum, nickel, gold, and silver; and the insulation layers are made of a material selected from the group consisting of: silicon dioxide and silicon nitride.

13. The optical multi-ring scanner of claim 10, wherein the outer ring driving element is further comprised of: a metallic bottom electrode layer, an electroplated magnetic layer, and an insulation layer sandwiched between the metallic bottom electrode layer and the electroplated magnetic layer; each inner ring driver is further comprised of: a metallic bottom electrode layer, an electroplated metal coil, and an insulation layer sandwiched between the metallic bottom electrode layer and the electroplated metal coil; the mirror element is further comprised of: a metallic bottom electrode layer, an electroplated metal coil, and an insulation layer sandwiched between the metallic bottom electrode layer and the electroplated metal coil; the end of each first torsion arm that is connected to the substrate is formed with an external electric connector to be used for connecting to an external power source; one component selected from the group consisting of: the outer ring driving element, the first inner ring driver, the mirror element and the combination thereof, is configured with at least one via hole to be used for enabling electric conduction between the metallic bottom electrode layer and the electroplated magnetic layer in the outer ring driving element, and between the metallic bottom electrode layer and the electroplated metal coil in the first inner ring driver; and, by the construction of the metallic bottom electrode layer and the electroplated magnetic layer in the outer ring driving element, and the metallic bottom electrode layer and the electroplated metal coil in the first inner ring driver, as well as the at least one via hole and the insulation layers, a current path is formed flowing between the outer ring driving element, the first inner ring driver, the mirror element and the two external electric connectors without causing any shortage.

14. The optical multi-ring scanner of claim 13, wherein the electroplated magnetic layers are made of a material selected from the group consisting of: nickel, magnetic alloys such as cobalt-nickel alloy, iron-nickel alloy, cobalt-nickel-manganese-phosphorous alloy; the electroplated metal coils and the metallic bottom electrode layers are made of a material selected from the group consisting of: copper, aluminum, nickel, gold, and silver; and the insulation layers are made of a material selected from the group consisting of: silicon dioxide and silicon nitride.

15. The optical multi-ring scanner of claim 10, wherein the outer ring driving element is further comprised of: a metallic bottom electrode layer, an electroplated metal coil, and an insulation layer sandwiched between the metallic bottom electrode layer and the electroplated metal coil; and the first inner ring driver is further comprised of: a metallic bottom electrode layer, an electroplated metal coil, and an insulation layer sandwiched between the metallic bottom electrode layer and the electroplated metal coil; the end of each first torsion arm that is connected to the substrate is formed with an external electric connector to be used for connecting to an external power source; one component selected from the group consisting of: the outer ring driving element, the first inner ring driver, the mirror element and the combination thereof, is configured with at least one via hole to be used for enabling electric conduction between the metallic bottom electrode layer and the electroplated metal coil in the outer ring driving element, and between the metallic bottom electrode layer and the electroplated metal coil in the first inner ring driver; and, by the construction of the metallic bottom electrode layers and the electroplated metal coils in the outer ring driving element and the first inner ring driver, as well as the at least one via hole and the insulation layers, a current path is formed flowing between the outer ring driving element, the first inner ring driver, the mirror element and the two external electric connectors without causing any shortage.

16. The optical multi-ring scanner of claim 15, wherein the electroplated metal coils and the metallic bottom electrode layers are made of a material selected from the group consisting of: copper, aluminum, nickel, gold, and silver; and the insulation layers are made of a material selected from the group consisting of: silicon dioxide and silicon nitride.

17. The optical multi-ring scanner of claim 10, wherein each of the outer ring driving element, the first inner ring driver and the mirror element is comprised of: a metallic bottom electrode layer, an electroplated metal coil, and an insulation layer sandwiched between the metallic bottom electrode layer and the electroplated metal coil; the end of each first torsion arm that is connected to the substrate is formed with an external electric connector to be used for connecting to an external power source; one component selected from the group consisting of: the outer ring driving element, the first inner ring driver, the mirror element and the combination thereof, is configured with at least one via hole to be used for enabling electric conduction between the metallic bottom electrode layer and the electroplated metal coil in the outer ring driving element, and between the metallic bottom electrode layer and the electroplated metal coil in the first inner ring driver; and, by the construction of the metallic bottom electrode layers and the electroplated metal coils in the outer ring driving element, the first inner ring driver and the mirror element, as well as the at least one via hole and the insulation layers, a current path is formed flowing between the outer ring driving element, the first inner ring driver, the mirror element and the two external electric connectors without causing any shortage.

18. The optical multi-ring scanner of claim 17, wherein the electroplated metal coils and the metallic bottom electrode layers are made of a material selected from the group consisting of: copper, aluminum, nickel, gold, and silver; and the insulation layers are made of a material selected from the group consisting of: silicon dioxide and silicon nitride.

19. The optical multi-ring scanner of claim 1, wherein the substrate is made of silicon while all of the outer ring driving element, the first inner ring driver, the first torsion arms, the second torsion arms, and the third torsion arms are all made of silicon are made of a material selected from the group consisting of: a metal and a magnetic material.

20. The optical multi-ring scanner of claim 19, wherein the metal is selected from the group consisting of: copper, aluminum, and steel, and the magnetic material is selected from the group consisting of: nickel, iron, cobalt, and magnetic alloys such as cobalt-nickel alloy, iron-nickel alloy, cobalt-nickel-manganese-phosphorous alloy.

21. The optical multi-ring scanner of claim 19, wherein the outer ring driving element has an electroplated magnetic layer formed therein; the first inner ring driver has an electroplated metal coil formed thereon while having an insulation layer to be formed and sandwiched between the first inner ring driver and the electroplated metal coil; the end of each first torsion arm that is connected to the substrate is formed with an external electric connector to be used for connecting to an external power source; one component selected from the group consisting of: the outer ring driving element, the first inner ring driver, the mirror element and the combination thereof, is configured with at least one via hole to be used for enabling electric conduction between the electroplated metal coil and the first inner ring driver; and, by the construction of the electroplated magnetic layer on the outer ring driving element, and the electroplated metal coil on the first inner ring driver, as well as the at least one via hole and the insulation layers, a current path is formed flowing between the outer ring driving element, the first inner ring driver, the mirror element and the two external electric connectors without causing any shortage.

22. The optical multi-ring scanner of claim 19, wherein the outer ring driving element has an electroplated magnetic layer formed therein; the first inner ring driver has an electroplated metal coil formed thereon while having an insulation layer to be formed and sandwiched between the first inner ring driver and the electroplated metal coil; the mirror element has an electroplated metal coil formed thereon while having an insulation layer to be formed and sandwiched between the mirror element and the electroplated metal coil; the end of each first torsion arm that is connected to the substrate is formed with an external electric connector to be used for connecting to an external power source; one component selected from the group consisting of: the outer ring driving element, the first inner ring driver, the mirror element and the combination thereof, is configured with at least one via hole to be used for enabling electric conduction between the electroplated metal coil and the first inner ring driver as well as between the electroplated metal coil and the mirror element; and, by the construction of the electroplated magnetic layer on the outer ring driving element, and the electroplated metal coils on the first inner ring driver and the mirror element, as well as the at least one via hole and the insulation layers, a current path is formed flowing between the outer ring driving element, the first inner ring driver, the mirror element and the two external electric connectors without causing any shortage.

23. The optical multi-ring scanner of claim 19, wherein the outer ring driving element has an electroplated metal coil formed thereon while having an insulation layer to be formed and sandwiched between the outer ring driving element and the electroplated metal coil; the first inner ring driver has an electroplated metal coil formed thereon while having an insulation layer to be formed and sandwiched between the first inner ring driver and the electroplated metal coil; the end of each first torsion arm that is connected to the substrate is formed with an external electric connector to be used for connecting to an external power source; one component selected from the group consisting of: the outer ring driving element, the first inner ring driver, the mirror element and the combination thereof, is configured with at least one via hole to be used for enabling electric conduction between the electroplated metal coil and the outer ring driving element as well as between the electroplated metal coil and first inner ring driver; and, by the construction of the electroplated metal coils on the outer ring driving element and the first inner ring driver, as well as the at least one via hole and the insulation layers, a current path is formed flowing between the outer ring driving element, the first inner ring driver, the mirror element and the two external electric connectors without causing any shortage.

24. The optical multi-ring scanner of claim 19, wherein the outer ring driving element has an electroplated metal coil formed thereon while having an insulation layer to be formed and sandwiched between the outer ring driving element and the electroplated metal coil; the first inner ring driver has an electroplated metal coil formed thereon while having an insulation layer to be formed and sandwiched between the first inner ring driver and the electroplated metal coil; the mirror element has an electroplated metal coil formed thereon while having an insulation layer to be formed and sandwiched between the mirror element and the electroplated metal coil; the end of each first torsion arm that is connected to the substrate is formed with an external electric connector to be used for connecting to an external power source; one component selected from the group consisting of: the outer ring driving element, the first inner ring driver, the mirror element and the combination thereof, is configured with at least one via hole to be used for enabling electric conduction between the electroplated metal coils and the outer ring driving element, between the electroplated metal coil and first inner ring driver as well as between the electroplated metal coil and the mirror element; and, by the construction of the electroplated metal coils on the outer ring driving element, the first inner ring driver and the mirror element, as well as the at least one via hole and the insulation layers, a current path is formed flowing between the outer ring driving element, the first inner ring driver, the mirror element and the two external electric connectors without causing any shortage.

25. The optical multi-ring scanner of claim 1, wherein the mirror element is coated with a reflection layer; and the reflection layer is made of a material selected from the group consisting of gold, silver, aluminum, nickel, and copper.

26. The optical multi-ring scanner of claim 1, further comprising:
    a screw tube, disposed under the substrate to be used for actuating the outer ring driving element.

27. The optical multi-ring scanner of claim 1, further comprising:
    a second inner ring driver, received inside the third hollow section while formed with a fourth hollow section that is provided for receiving the mirror element therein; and the second inner ring driver further having a pair of fourth torsion arms symmetrically disposed at the two opposite sides of the second inner ring driver while being connected to the first inner ring driver in a manner that the fourth torsion arms are arranged coaxial with the second torsion arms as well as the third torsion arms.

* * * * *